F. ADAMS.
MEANS FOR USE IN FEEDING SHEEP AND CATTLE.
APPLICATION FILED AUG. 13, 1914.

1,155,189.

Patented Sept. 28, 1915.

WITNESSES
Alfred R. Anderson
Cornelius Hoving

INVENTOR
FRANK ADAMS
By H. Van Deventer
ATTORNEY

COLUMBIA PLANOGRAPH CO., WASHINGTON, D. C.

UNITED STATES PATENT OFFICE.

FRANK ADAMS, OF BLENHEIM, NEW ZEALAND.

MEANS FOR USE IN FEEDING SHEEP AND CATTLE.

1,155,189.  Specification of Letters Patent.  Patented Sept. 28, 1915.

Application filed August 13, 1914. Serial No. 856,572.

*To all whom it may concern:*

Be it known that I, FRANK ADAMS, subject of the King of Great Britain, residing at Blenheim, in the Dominion of New Zealand, have invented a new and useful Improved Means for Use in Feeding Sheep and Cattle; and I do hereby declare the following to be a full, clear, and exact description of the same.

This invention has been designed in order to provide means whereby large quantities of chaff and other like foods may be stored and automatically supplied to feeding troughs in order to supply food for stock. The means designed are such as to be adapted to receive the feed direct from the chaff cutter employed in preparing it and thereby to save the trouble and expense entailed in first bagging the feed, then storing it and afterward distributing it to the stock.

The invention consists in the combination with a chaff cutter machine having a blower and delivery spout thereon by which the chaff is carried away through the spout, of a feeding shed or storage chamber into which the chaff is carried by the spout and which is constructed to supply feed troughs or mangers continuously with the chaff.

The storage chamber or feeding shed may be of special construction such as to provide for it receiving a large quantity of the chaff, which is then stored in bulk therein and is fed by gravity into the mangers constructed along its sides so that the sheep and cattle may feed therefrom.

In the accompanying drawing a construction of shed that has been designed as suitable for carrying out the invention, has been shown, although it is not desired to confine the invention exclusively to such construction.

Figure 1:
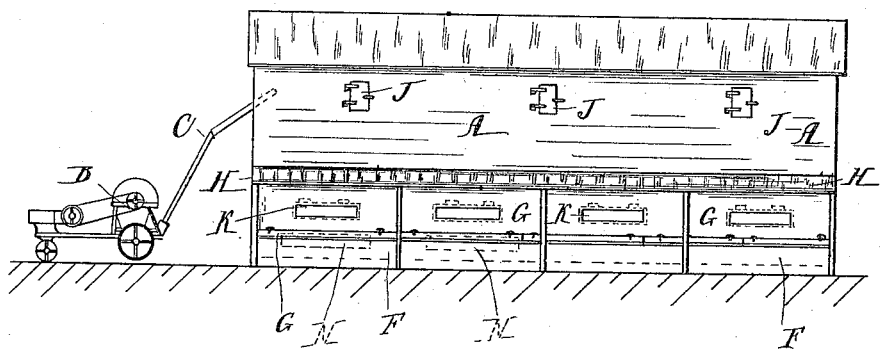
Figure 2:
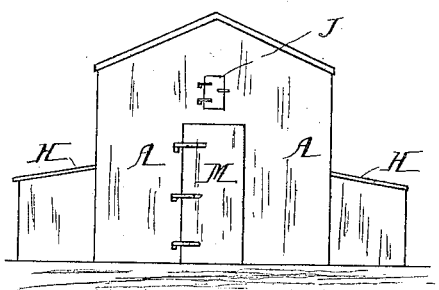
Figure 3:
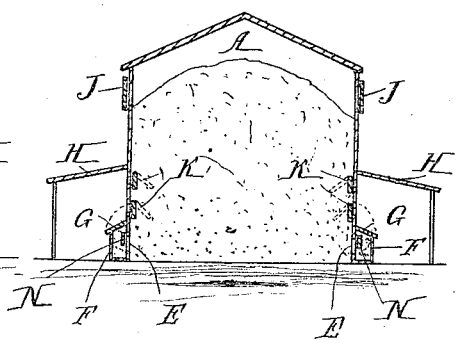

In the drawings:—Figure 1 is a side elevation of the shed and illustrating the manner of filling it. Fig. 2 is an end elevation, and Fig. 3 a cross sectional elevation thereof.

The shed A is designed to receive the chaff from a chaff cutter B of any of the known designs and made portable so that it may be moved to different points around the shed and conveyed about as required in its working. The chaff cutter is provided with a blower of any suitable form by means of which the chaff is carried through the spout C combined therewith and made of any required length.

The shed A is made in a manner suitable to receive and store the chaff and to retain it in a dry condition. Each side is made with a slot E at about the floor level extending along it and opening into a long trough or manger F so that the chaff gravitating from the shed will fill such manger. Lids or covers G are hinged to the mangers so as to close the whole or any portions thereof whenever desired.

An awning H is erected over the manger on each side so as to provide shelter for the cattle while feeding and to protect the mangers from the weather. The two ends of the spaces beneath the awnings may be closed in for a similar purpose.

Openings J covered by suitable doors are made at intervals in the sides and ends of the shed and near the top thereof. Each of these openings is adapted to receive the blower spout so that the chaff may be delivered into the shed at different points over its area in order to provide for an equal distribution therein. The sides of the shed beneath the awnings H are also furnished with two series of trap door openings K arranged one above the other and with their doors opening inward. These openings provide for the chaff within the shed being poked and stirred whenever required so as to keep the chaff from lumping and to insure of it gravitating freely into the mangers. The ends of the shed are provided with large entrance doors M to allow of the shed being emptied and cleaned whenever desired. The shed may, if required, be mounted on wheels to permit of it being moved about or it may be otherwise made transportable.

If desired loosely hanging flaps N may be arranged to depend for part way over the slot E at each manger in order to prevent the feed being blown from the mangers by high winds, when the mangers are left open.

What I do claim as my invention, and desire to secure by Letters Patent is:—

In means for use in feeding sheep and cattle, a storage shed provided with filling doors in its sides and ends and near the top thereof, a number of slot openings in the sides of the shed, near the bottom thereof, a manger beneath each of such openings, stirring apertures in the sides of the sheds situated above the manger slots and hinged
5 covers upon the insides of such openings, substantially as specified.

In testimony whereof, I have signed this specification in the presence of two subscribing witnesses.

FRANK ADAMS.

Witnesses:
W. ALEXANDER,
M. E. BROWN.

Copies of this patent may be obtained for five cents each, by addressing the "Commissioner of Patents, Washington, D. C."